(12) United States Patent
Berti et al.

(10) Patent No.: US 7,398,937 B2
(45) Date of Patent: Jul. 15, 2008

(54) SHREDDING MACHINE

(75) Inventors: Mario Berti, Caldiero (IT); Filippo Berti, Caldiero (IT)

(73) Assignee: Berti Macchine Agricole S.r.l., Caldiero (IT)

( * ) Notice: Subject to any disclaimer, the term of this patent is extended or adjusted under 35 U.S.C. 154(b) by 207 days.

(21) Appl. No.: 11/023,399

(22) Filed: Dec. 29, 2004

(65) Prior Publication Data

US 2005/0156069 A1 Jul. 21, 2005

(30) Foreign Application Priority Data

Jan. 21, 2004 (IT) ............................ VI2004A0010

(51) Int. Cl.
*A01D 34/03* (2006.01)
(52) U.S. Cl. ............................ 241/101.76; 241/101.78; 241/285.3
(58) Field of Classification Search ............ 241/101.76, 241/101.78, 285.3; 561/341, 14.4, 156, 294; 56/341, 14.1, 156, 294
See application file for complete search history.

(56) References Cited

U.S. PATENT DOCUMENTS 5,598,690 A * 2/1997 McClure et al. ............... 56/341
6,370,581 B2 * 4/2002 Uros et al. ............... 56/10.2 R
6,581,364 B2 * 6/2003 Lucand et al. ................ 56/341
6,769,239 B1 * 8/2004 Webb .......................... 56/341
2003/0071151 A1 4/2003 Gross
2003/0183708 A1 10/2003 Code

FOREIGN PATENT DOCUMENTS

| DE | 2551271 | 5/1976 |
| DE | 3444609 | 6/1986 |
| DE | 9116679 | 9/1993 |
| EP | 1232683 | 8/2002 |
| EP | 1364570 | 11/2003 |
| WO | 03053133 | 7/2003 |

* cited by examiner

*Primary Examiner*—Shelley Self

(57) ABSTRACT

A shredder for pruning sarments and similar materials, comprising a frame provided with wheels on which are installed: a shredding group, a storage container and a conveying conduit of the shredded sarments from the shredding group to the storage container. The storage container comprises hinging means to the frame, which define a rotation axis, and it is coupled with driving means able to put it in rotation around the rotation axis to overturn it and obtain the discharge of the shredded sarments

23 Claims, 7 Drawing Sheets

SHREDDING MACHINE

BACKGROUND OF THE INVENTION

The present invention is about a shredding machine suitable in particular for being used to collect and shred pruning sarments in vineyards and orchards, or material derived from trimming of fences and trees.

It is known that, after the fruit and grapes harvesting in orchards and vineyards respectively, the pruning of the plants is performed, during which a considerable quantity of pruning sarments falls on the ground, the modern working techniques requiring to remove them from the ground.

For this purpose, shredding machines are available on the market, able to collect and to shred the sarments, then leaving them to fall on the ground once shredded.

In this way, the sarments produced during the vineyard pruning are removed and reduced in their size, freeing the ground.

The shredded organic material generally remains on the ground, turning into a natural fertilizer for the surrounding grapes and fruit-trees.

All the shredding machines belonging to the prior art, although in their different specific embodiments, substantially consist of a frame on which a pruning sarments shredding group is installed, while the shredded material is scattered on the ground.

These shredders are generally connected, through proper fastening means, to respective operating machines which draw them along the land on which the sarments to be shredded are present.

The shredding group generally consists of a rotating drum, provided with outer blades which take the sarments from the ground and shred them, cooperating with respective counter-blades belonging to the frame of said shredding machine.

The rotating drum is put in rotation through a driving unit, generally belonging to the operating machine to which the shredder is connected, receiving the motion therefrom through proper transmission means.

In case of the land to be worked is particularly uneven or stony, shredders provided with picking means interposed between the shredding group and the ground are used.

The picking means comprise a rotating drum provided with outer teeth which perform the function to pick up the sarments from the ground and to convey them to the shredding group, which subsequently provides to shred them.

The presence of picking means makes easier to pick up the sarments from the ground if, as previously mentioned, it has a particularly complex and not uniform morphology, thus avoiding that the shredding blades are damaged in the contact with stones or other particularly hard materials.

The picking means are put in rotation in this case too, receiving the motion from the driving group belonging to the operating machine through proper transmission means of known type.

In both these executive embodiments of a shredding machine, the shredded material is discharged on the ground.

However, the cited shredding machines of known type have some acknowledged inconveniences.

A first inconvenience is due to the fact that the shredded sarments are scattered on the ground.

As a consequence, this material, essentially consisting of wood, has to be picked up from the ground to be used for other purposes, like for instance the manufacture of stove pellets or other.

It is evident that, in this case there is the inconvenience that another operation should be performed, with a consequent increase of costs.

Another inconvenience is due to the fact that, spreading the shredded material on the ground and becoming said material a fertilizer for the plants present therein, there is the risk to transmit possible diseases from diseased plants to healthy ones.

The risk of plant disease propagation and/or undesired cross-fertilizations is very considered in agriculture in general, and in particular in vineyard cultivation where, as a consequence, it is very important to maintain clean the ground surrounding the plants.

SUMMARY OF THE INVENTION

The present invention intends to overcome the aforementioned inconveniences.

It is a first object of the invention to provide for a shredding machine for picking and shredding pruning sarments in vineyards and orchards in which it is possible to collect and store the shredded material, avoiding that it is spread on the surrounding ground.

It is another object of the invention to provide for a shredding machine which allows to collect and store the shredded material to reuse or sell it.

It is a further object of the invention to provide for a shredding machine which allows to store and subsequently discharge the shredded material in a quick and economic way.

Still another object of the invention is to provide for a shredding machine which contributes to preserve the plants from the diffusion of diseases from diseased plants to healthy ones.

Said objects are obtained by providing for a shredding machine for pruning sarments and the like which, according to the main claim, comprises a wheeled frame on which are installed:

a shredding group of said sarments;

a storage container able to receive said shredded sarments coming from said shredding means; and a conveying conduit of said shredded sarments from said shredding group to said storage container, wherein said storage container comprises hinging means to said frame able to define a rotation axis and it is coupled with driving means able to put it in rotation around said rotation axis to overturn it and obtain the discharge of said shredded sarments.

Advantageously, the presence of a storage container allows to collect the shredded sarments, avoiding that they are scattered on the surrounding ground.

More advantageously, the presence of driving means able to put in rotation the container around a horizontal axis makes more quick and efficient the discharge of the shredded sarments, for instance into a truck body or an agricultural trailer.

BRIEF DESCRIPTION OF THE DRAWINGS

The aforesaid objects and advantages will be better highlighted in the description of a preferred executive embodiment of the invention, given in an explanatory but not limiting way, with reference to the figures of the annexed drawings, wherein.

DESCRIPTION OF THE INVENTION

Figure 1:
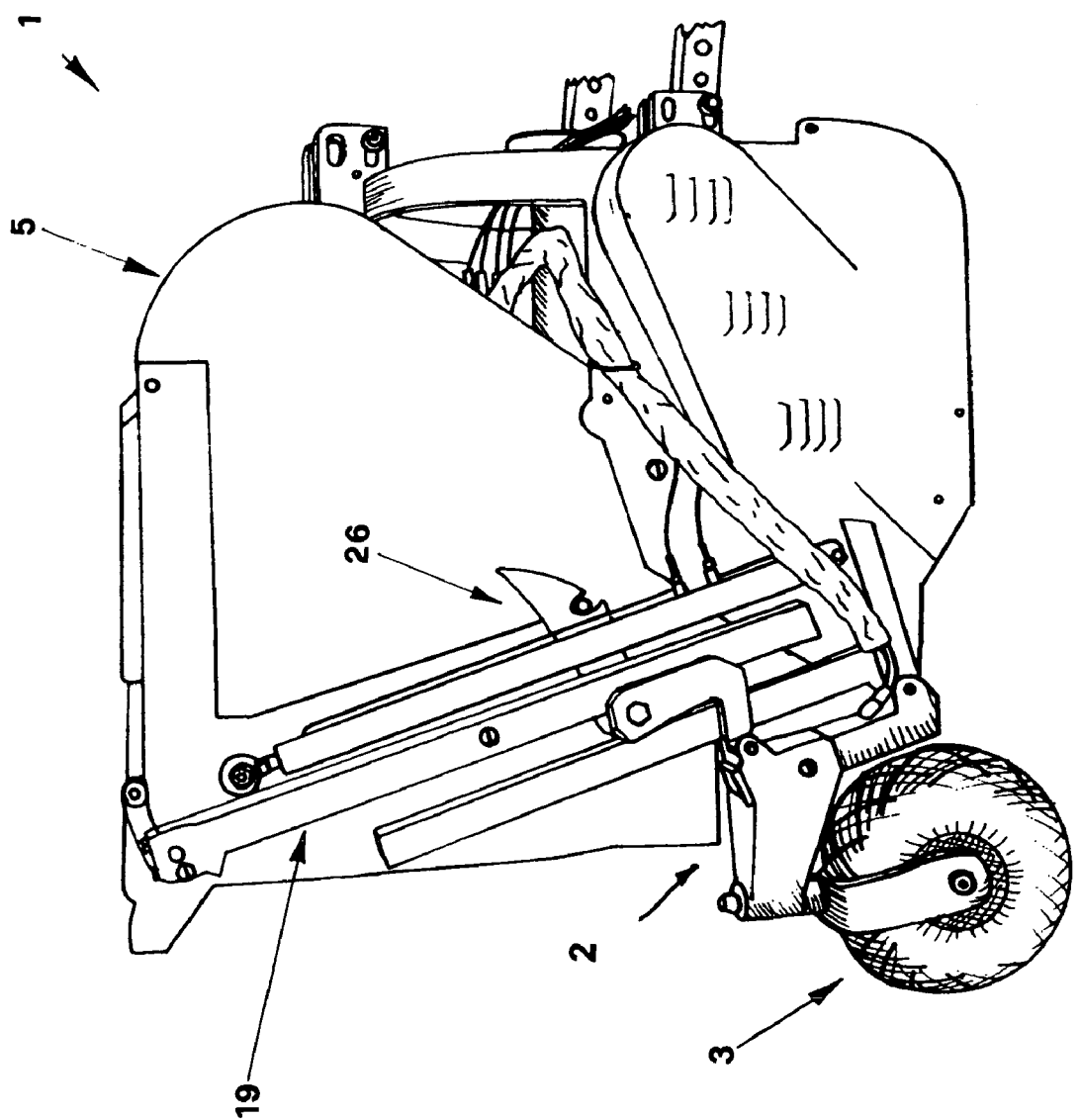
FIG. 1 is an axonometric view of the shredding machine of the invention.

As one can see in FIG. 1, the shredding machine for pruning sarments or similar materials according to the invention, generally indicated with numeral 1, comprises a frame 2 provided with wheels 3 on which are installed:
- a shredding group 4 of said sarments;
- a storage container 5 able to receive said shredded sarments; and
- a conveying conduit 6 of said shredded sarments from said shredding group 4 to said storage container 5.

According to the invention, the storage container 5 comprises hinging means 7 to said frame 2 able to define a rotation axis 8 and it is coupled with driving means 9 able to put it in rotation around said rotation axis 8 to overturn it and obtain the discharge of said shredded sarments.

Concerning the storage container 5, it consists of a housing 10, preferably but not necessarily made of metal, which comprises in its lower portion a loading mouth 11 able to receive the shredded sarments from the shredding group 4.

Figure 2:
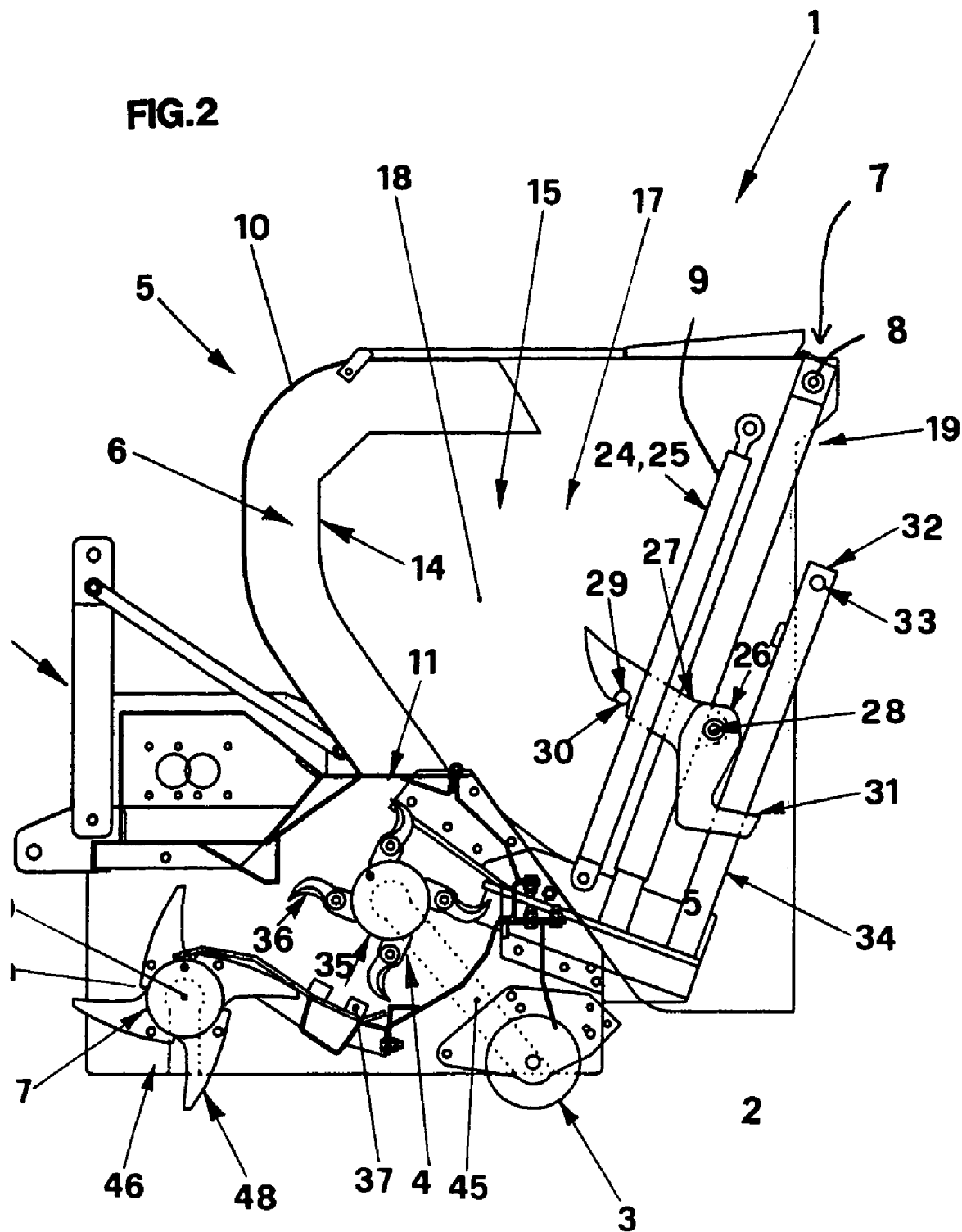
FIGS. 2 to 4 are sectional view of the shredding machine of FIG. 1 in different operation stages.

When the storage container 5 is in operative position, shown in FIG. 2, the loading mouth 11 is disposed facing the shredding group 4, from which it receives the shredded sarments.

Figure 4:
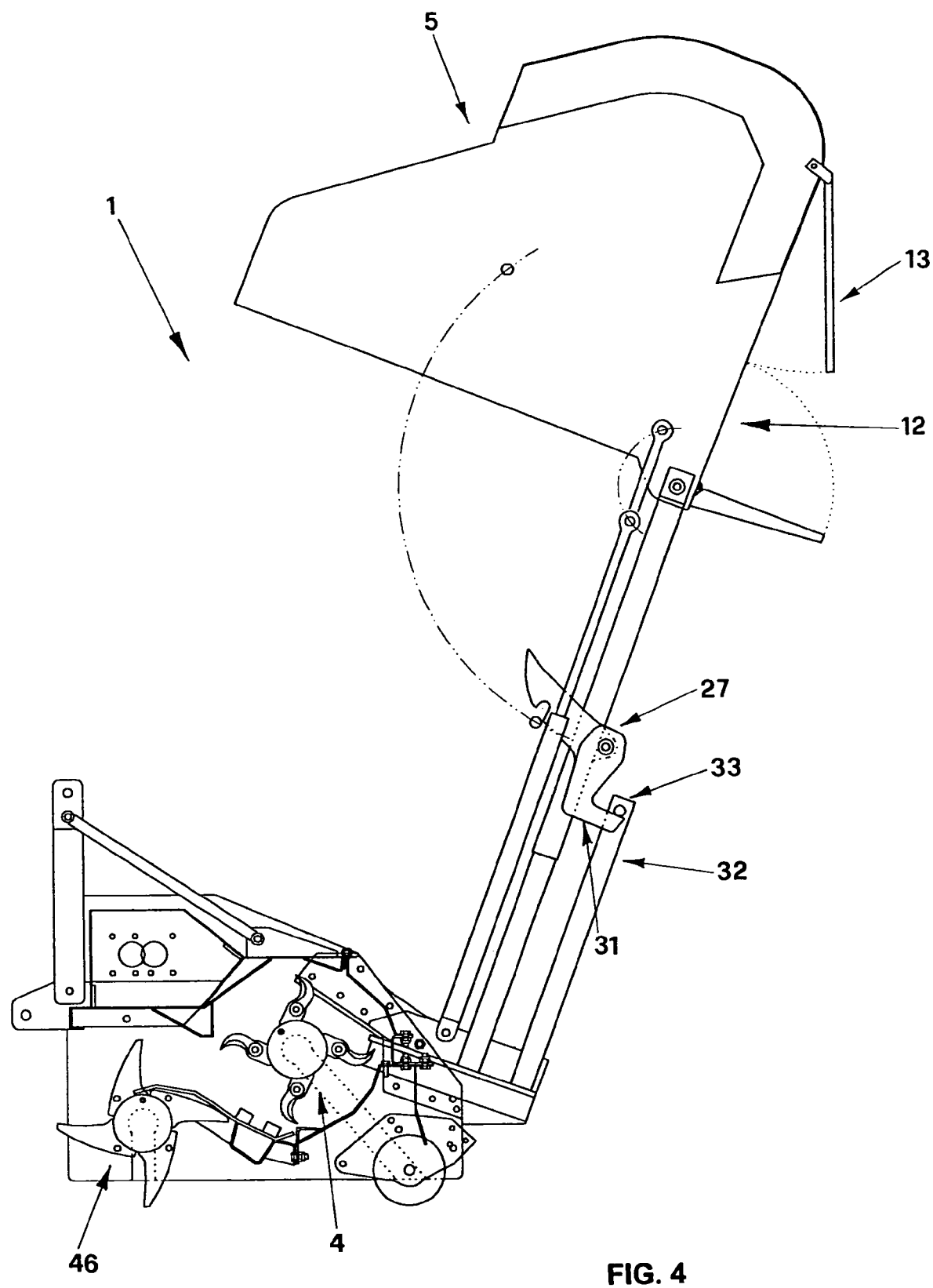
Figure 5:
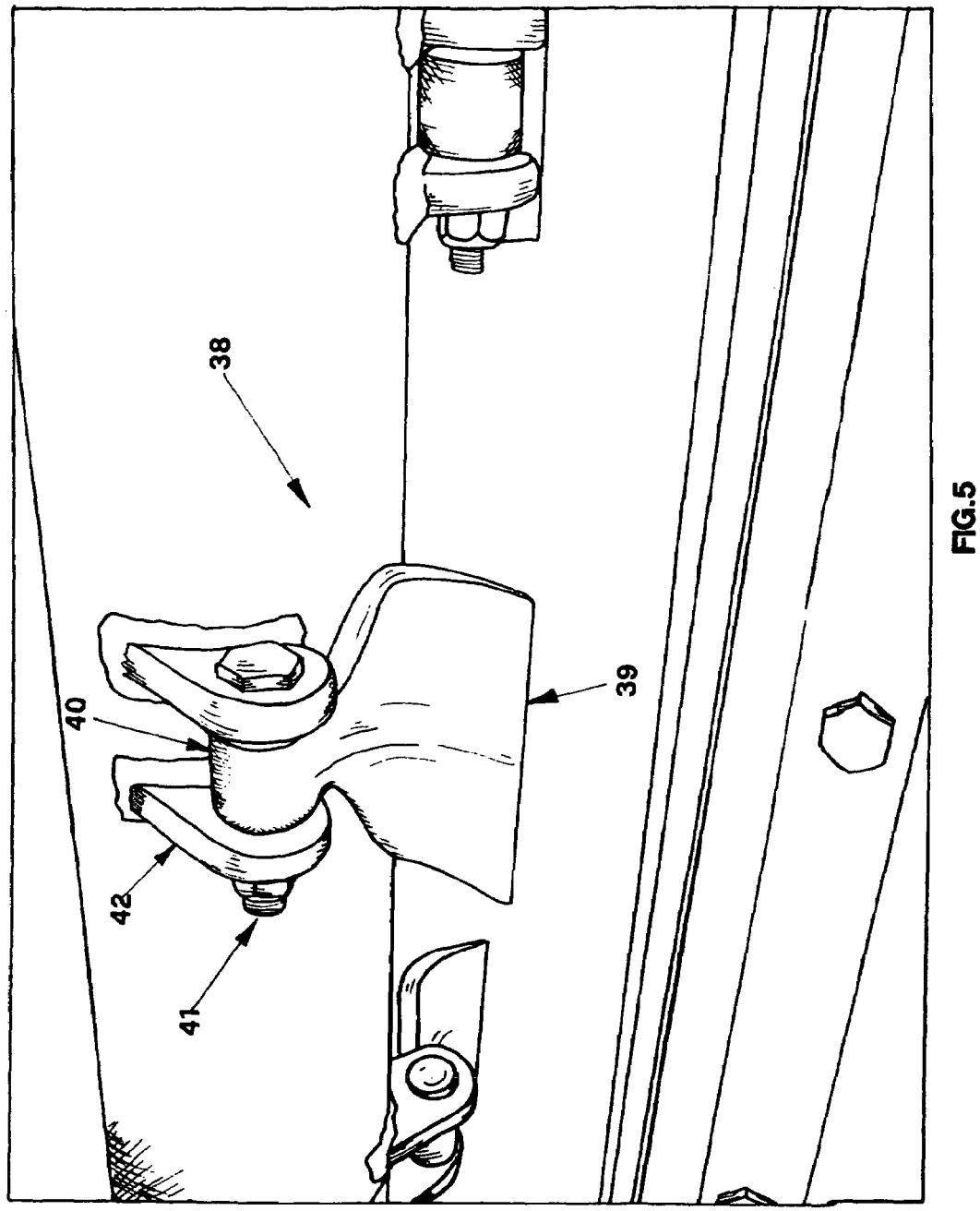
FIGS. 5 to 7 show details of the shredding machine of FIG. 1.
Figure 6:
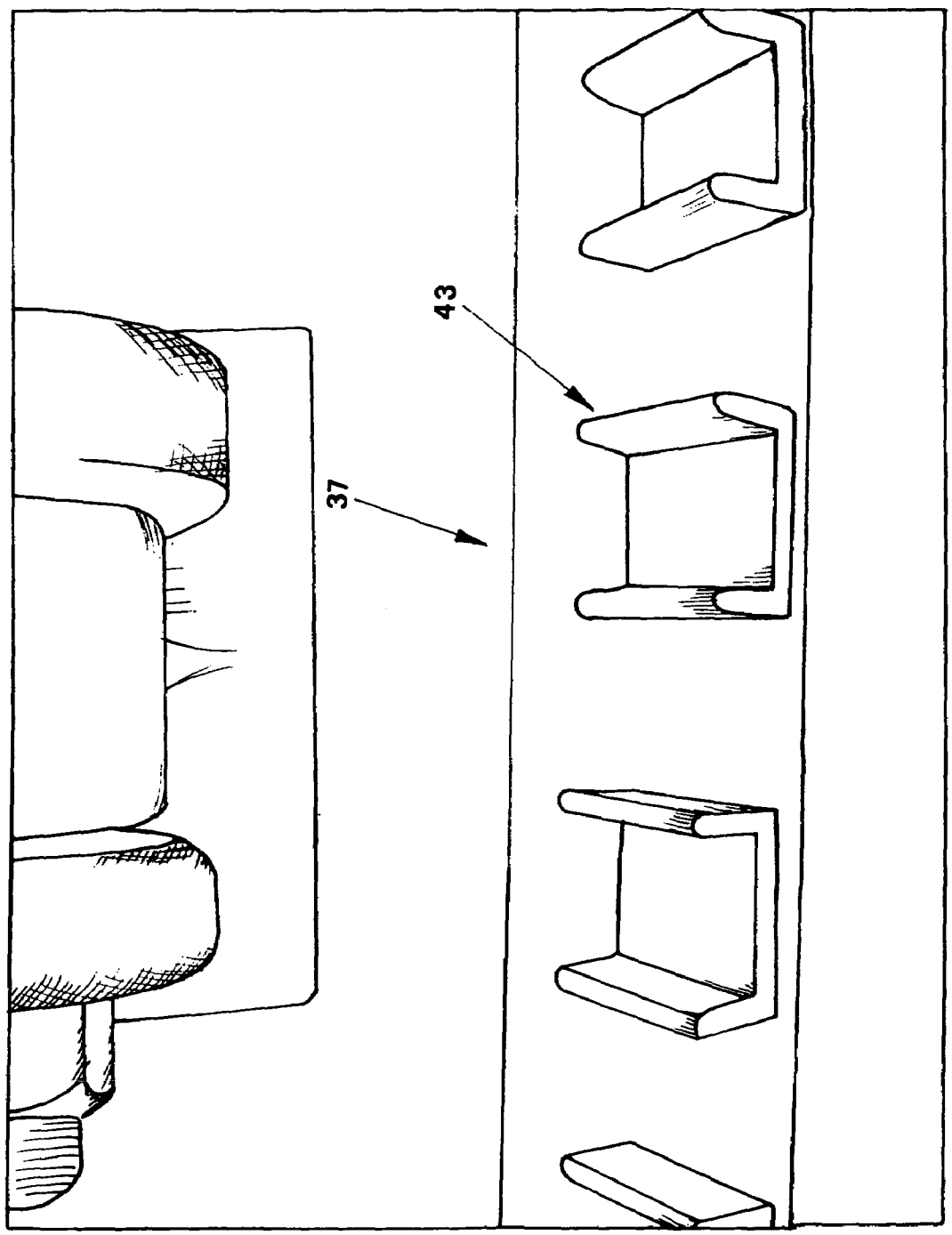
Figure 7:
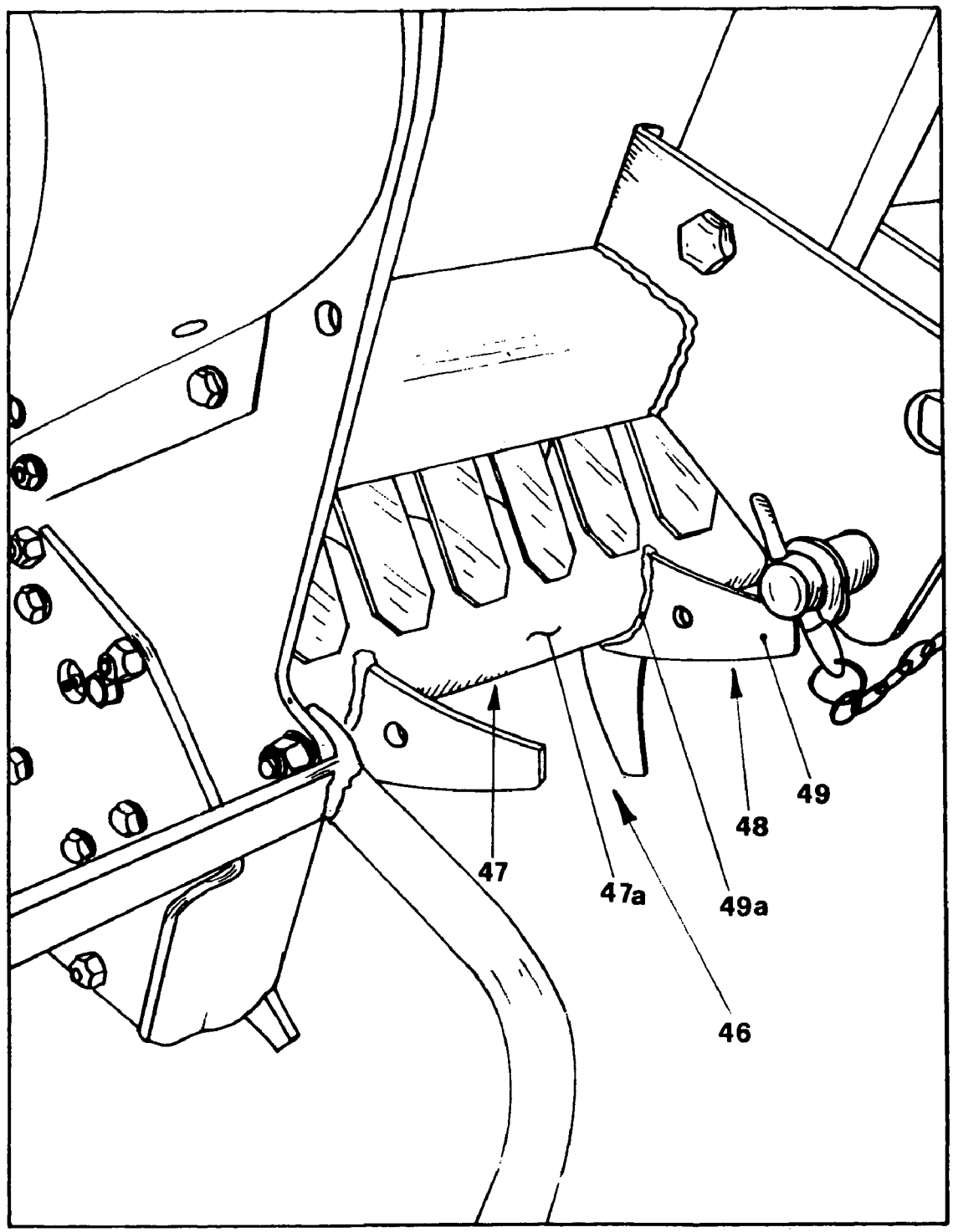

In the upper portion of the storage container 5 an unloading mouth 12 is present, provided with a door 13 from which, as one can see in FIG. 4, the discharge of the shredded sarments takes place, for instance into a truck body or an agricultural trailer (not shown in the drawings), when the container 5 is lifted and overturned.

The storage container 5 is internally provided with a partition baffle 14, disposed in a substantially vertical position, which divides the internal volume 15 in two zones.

The zone 16 defines a substantially vertical conveying conduit 6, in communication with the loading mouth 11, through which the shredded sarments coming from the shredding group 4 are conveyed inside the zone 17, in communication with the unloading mouth 12, which defines the storage volume 18 for the shredded sarments.

The conveying conduit 6 allows the shredded sarments to be collected inside the storage volume 18 of the container 5, driven by the centrifugal force produced by the shredding group 4, without falling back in said shredding group 4.

The storage container 5 is connected, in its upper portion, to a lifting structure 19 which allows to lift up the container 5 to make easier the unloading operations of the shredded sarments, for instance into a truck body or an agricultural trailer.

The connection between the storage container 5 and the lifting structure 19 is obtained through hinges 7, able to allow to overturn said storage container 5 by the rotation around the axis 8 defined by the hinges pins 7 when the storage container 5 is in unloading position, as shown in FIG. 4.

Concerning the lifting structure 19, it substantially consists of two tubular elements 20, 21 hinged to the container 5 and able to be telescopically mutually moved with respective fixed tubular elements 22, 23 joined to the frame 2.

The driving means 9 preferably but not necessarily consist of linear hydraulic actuators 24, 25 in which the stem 24a, 25a or the sleeve 24b, 25b is joined to the frame 2 of the machine 1, while the sleeve 24b, 25b or the stem 24a, 25a is joined to the storage container 5.

When the hydraulic circuit is pressurized, the hydraulic actuators 24, 25 vertically move the lifting structure 19 and consequently the storage container 5 associated therewith.

Figure 3:
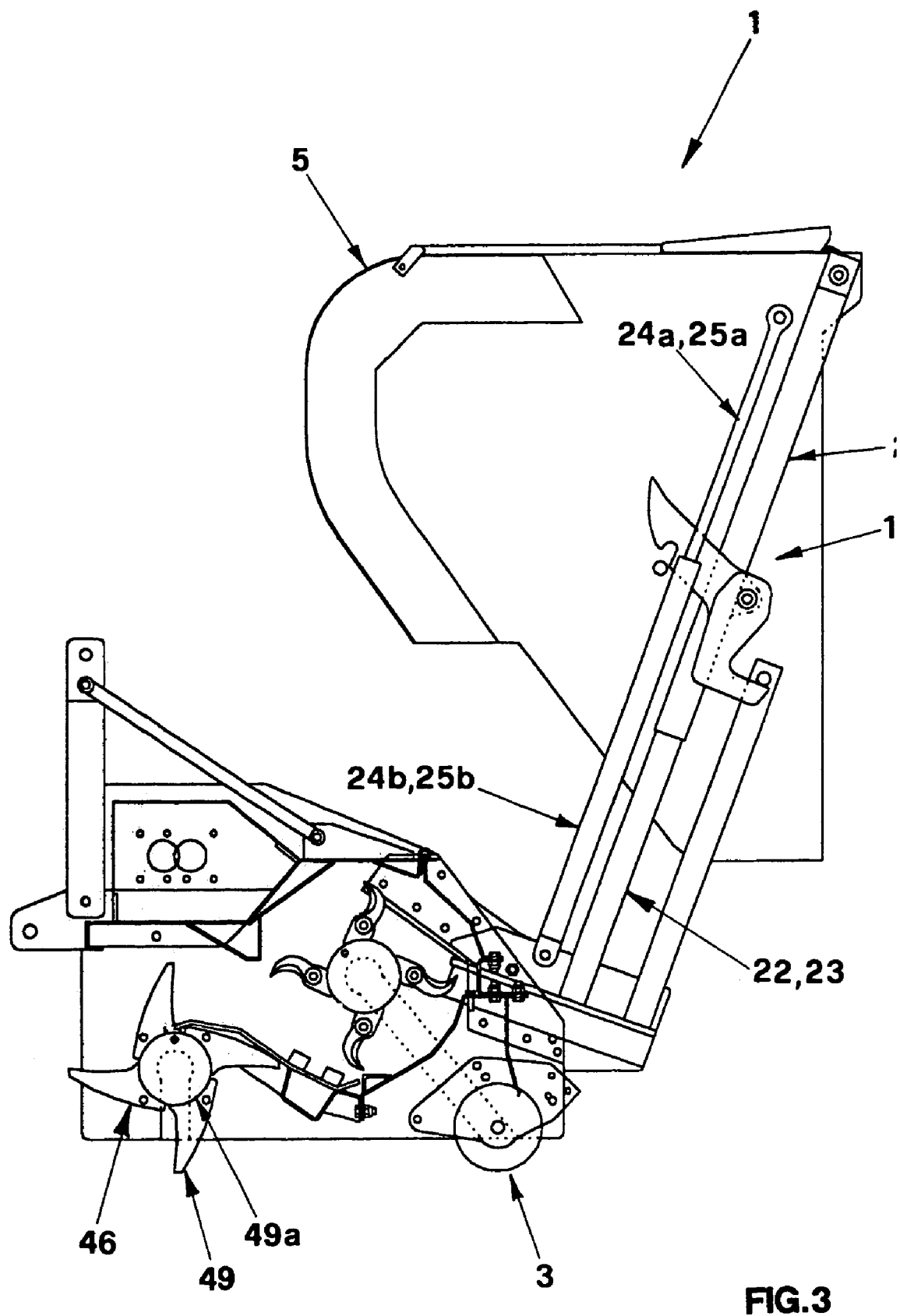

The lifting structure 19 is provided with anchoring means 26 which constrain the container 5, avoiding its overturning until it reaches the lifted unloading position shown in FIG. 3.

The anchoring means 26 consist of a lever 27 having an intermediate fulcrum 28 for the connection to the lifting structure 19.

The lever 27 is provided with a hooking tooth 29 to a pin 30 belonging to the storage container 5 at one end, and with a contrast element 31, which cooperates with contrast means 32 consisting of a striker element 33 belonging to a bar 34 joined to the frame 2, at the other end.

When the container 5 is close to the lifted position, shown in FIG. 3, the contrast element 31 of the lever 27 abuts against the striker element 33 joined to the bar 34, blocking the vertical movement, so that the lever 27 undergoes a rotation which releases the pin 30, allowing the container 5 to be overturned by means of the above described hydraulic actuators 24, 25, as one can see in FIG. 4.

The anchoring lever 27 is made of a shaped metal profile.

Concerning the shredding group 4, it comprises a rotating drum 35 provided with outer shredding blades 36 which cooperate with respective shredding counter-blades 37 coupled with the frame 2 of the shredding machine 1.

Each of the outer shredding blades 36 consists of a shaped metal body 38 provided with a sharp edge 39 at one end and with a hub 40, able to receive a pin 41 for the connection to forks 42 belonging to the rotating drum 35, at the other end.

The outer shredding blades 36 have the body 38 shaped in the form of a spoon; however, in other embodiments, the blades could be made of "Y" shaped laminar elements.

Concerning the shredding counter-blades 37, they consist of little metal plates 43 projecting toward the shredding blades 36, with which they cooperate to shred the sarments.

The shredding machine 1 shown in FIG. 1 is connected, through proper joining means 44, to an operating machine which draws it along the land on which the sarments to be picked and shredded are present.

The rotating drum 35 of the shredding group 4 is activated, through a preferably but not necessarily belt drive 45, by the driving unit of the operating machine to which the shredder 1 is connected.

In other executive embodiments, the shredder could also be provided with a self-contained driving unit able to make it self-propelled.

The shredding machine 1 of the invention is furthermore provided with picking means 46, interposed between the shredding group 4 and the ground to be worked, which pick the sarments and convey them to the shredding group 4.

The picking means 46 substantially consist of a rotating drum 47, provided with picking teeth 48 able to pick up the sarments from the ground.

The picking teeth 48 are associated with the edge of the rotating drum 47 and have a profile 49 of substantially trapezoidal shape, with the longer base 49a fixed on the surface 47a of the drum 47.

The picking group 46 and the shredding group 4 are disposed so that the minimum distance between the free end of the picking teeth 48 and the shredding blades 36 is preferably comprised between 0.5 cm and 15 cm to better convey the sarments from the picking group 46 to the shredding group 4.

Like the shredding group 4, the rotating drum 47 too is operated, through a preferably but not necessarily chain drive 50, by the driving unit of the operating machine to which the shredder 1 is connected.

In other executive embodiments, not shown in any of the annexed drawings, the shredding machine of the invention could be lacking in the described picking means of the sarments from the ground.

In this case, the sarments picking operation from the ground takes place by means of the shredding teeth belonging to the shredding group, that in this kind of machine perform the double function of picking and shredding the sarments.

The use of shredding machines 1 provided with the aforementioned picking means 46 is particularly fit in case of the shredder 1 has to operate on uneven or stony land, to avoid the shredding teeth 36 to be damaged.

Operatively, the shredding machine 1 of the invention is connected to an operating machine which draws it along the land on which the sarments to be picked and shredded are present.

While the machine 1 is moving forward, the picking teeth 48 coupled with the rotating drum 47 pick up the sarments from the ground and convey them to the shredding group 4.

The sarments are shredded inside the shredding group 4, between the shredding blades 36 and the shredding counter-blades 37, and they are subsequently driven inside the conveying conduit 6 under the effect of the centrifugal force developed by the rotation of the shredding drum 35.

From the conveying conduit 6, the shredded sarments pass inside the storage volume 18 present inside the container 5.

Once completed the picking and shredding operations, or when the storage container 5 is full, the shredded sarments are discharged in a proper area, or for instance into a truck body.

The linear hydraulic actuators 24, 25 are activated, which vertically move the lifting structure 19 raising the storage container 5.

In this first stage, the storage container 5 is substantially vertically displaced without undergo any rotation, by the presence of the anchoring means 26 which constrain the pin 30.

When the container 5 reaches the raised position, shown in FIG. 3, the contrast element 31 of the lever 27 abuts against the striker element 33 coupled with the frame 2, thus blocking the vertical movement, and the lever 27 undergo a rotation that releases the pin 30, allowing to overturn the container 5 by means of the aforementioned hydraulic actuators 24, 25, as one can see in FIG. 4.

Once the discharging of the shredded sarments is completed, the stem 24a, 25a of the linear hydraulic actuators 24, 25 is drawn back, so that the container 5 can be rotated in the opposite direction and brought back in the position shown in FIG. 3.

Once the rotation of the container 5 is completed, the anchoring means 26 constrain again the pin 30 and the storage container 5 is brought back again in its operative position disposed near the shredding group 4, as shown in FIG. 2.

On the basis of the aforesaid description, it should be understood that the shredding machine of the invention achieves all the intended objects. In particular, it is achieved the object to provide for a shredding machine for picking and shredding pruning sarments in vineyards and orchards in which it is possible to pick and store the shredded material thanks to the presence of a storage container.

It is achieved the object to provide for a shredding machine which avoids to scatter the shredded material on the surrounding ground.

In this way, the double object to avoid the diffusion of diseases from diseased plants to healthy ones and to reuse the shredded material, for instance to manufacture wood stove pellets, is reached too.

Furthermore, the possibility to raise and overturn the storage container makes easier the unloading operations of the shredded sarments, for instance into a truck body or an agricultural trailer.

Modifications and variations to the shredding machine of the invention, not described and not shown in the drawings, could be introduced in the executive stage.

All the described and any other not cited embodiments, if they fall within the scope of protection of the following claims, should be intended as protected by the present patent.

The invention claimed is:

1. A shredder for pruning sarments, comprising:
   a frame having wheels;
   a shredding group mounted on the frame, said shredding group including means for shredding said sarments;
   a hinge secured to the frame, said hinge defining an axis of rotation;
   a storage container for receiving said shredded sarments from the shredding group, said storage container being secured to the hinge for rotation about said axis between a loading position proximate to the frame for receiving shredded sarments and an unloading position discharging sarments;
   a conveying conduit mounted on the frame for conveying said shredded sarments from said shredding group to said storage container,
      driving means mounted on the frame coupled to the storage container, said driving means for rotating the storage container between the loading position and the unloading position about said axis to overturn the storage container to discharge said shredded sarments therefrom;
      a lifting structure slidingly connected to the frame and to the container for lifting the container from the loading position proximate the shredding group to a position spaced from the shredding group;
      anchoring means joined to the lifting structure, said anchoring means for constraining rotation of the container with respect to the lifting structure when the container is in the loading position, said anchoring means including a lever having a hooking tooth and a pin secured to the container
      a contact device joined to the frame, said contact device cooperating with the anchoring means to release the container from said lifting structure when the container is lifted to the spaced position and to allow the container to rotate to the unloading position.

2. The shredder according to claim 1, wherein said lever has an intermediate fulcrum for connection to the lifting structure, and the contact device has an end abutting against said contact device.

3. The shredder according to claim 2, wherein said contact means comprises a striker element coupled to a bar joined to said frame.

4. The shredder according to claim 1, wherein said means for shredding comprises a rotating drum; outer shredding blades; and counter-blades cooperating therewith coupled with said frame.

5. The shredder according to claim 4, wherein each of said outer shredding blades comprises a shaped metal body provided with a sharp edge and with a hub for receiving a pin for connection to forks secured to said rotating drum.

6. The shredder according to claim 4, wherein said outer shredding blades are shaped in the form of a spoon.

7. The shredder according to claim 4, wherein said outer shredding blades comprise "Y" shaped laminar elements.

8. The shredder according to claim 4, wherein said shredding counter-blades comprise plates projecting toward said shredding blades.

9. The shredder according to claim 1, further comprising fastening means for connecting said shredder to an operating machine.

10. The shredder according to claim 4, including driving means coupled to the rotating drum for rotating said drum.

11. The shredder according to claim 10, wherein said rotation transmission means of said rotating drum comprises a belt drive.

12. The shredder according to claim 4, further comprising a driving unit for the rotation of said rotating drum.

13. The shredder according to claim 1, wherein said storage container has a partition baffle secured therein.

14. The shredder according to claim 1, wherein said storage container includes a loading mouth for said shredded sarments, said mouth disposed in a lower portion of the storage container near said shredding group when the storage container is in the loading position, and an unloading mouth for said sarments, disposed in an upper portion thereof when the storage container is in said loading position.

15. The shredder according to claim 14, wherein said unloading mouth for said shredded sarments has an unloading door.

16. The shredder according to claim 1, wherein said driving means comprise linear actuators.

17. The shredder according to claim 1 wherein said lifting structure includes a fixed structure defining a telescopic guide in which said lifting structure forms a sleeve and said fixed structure forms a stem or the sleeve.

18. The shredder according to claim 1, further comprising collecting means including a rotating drum having outer picking teeth for picking said sarments, to convey them to said shredding group.

19. The shredder according to claim 1, further comprising a rotating drum having outer picking teeth for picking up said sarments, to convey them to said shredding group and subsequently to said storage container through said conveying conduit.

20. The shredder according to claim 19, including a transmission coupled between said rotating drum and the driving unit.

21. The shredder according to claim 20, wherein said transmission comprises a chain drive.

22. The shredder according to claim 20, further comprising a driving unit for rotating said rotating drum.

23. The shredder according to claim 1, further comprising a driving unit coupled to the wheels for driving the shredder.

* * * * *